United States Patent [19]

Browning et al.

[11] Patent Number: 4,591,211
[45] Date of Patent: May 27, 1986

[54] LOCKABLE CENTRAL NUT FOR VEHICLE WHEEL MOUNTING

[75] Inventors: James R. Browning, Berea; Louis D. Carlo, Cleveland, both of Ohio

[73] Assignee: Mr. Gasket Company, Cleveland, Ohio

[21] Appl. No.: 660,403

[22] Filed: Oct. 12, 1984

[51] Int. Cl.$^4$ ................................. B60B 3/16
[52] U.S. Cl. ................. 301/9 G; 301/9 CN; 301/37 AT
[58] Field of Search ............ 301/9 G, 9 DH, 9 CN, 301/9 DN, 37 AT, 37 SC, 9 SC

[56] References Cited

U.S. PATENT DOCUMENTS

| | | | |
|---|---|---|---|
| 1,935,651 | 11/1933 | Mendez | 301/9 G |
| 1,995,097 | 3/1935 | Fry | 301/9 G |
| 2,718,434 | 9/1955 | Sheaffer | 301/9 G |
| 4,537,449 | 8/1985 | Hayashi | 301/9 CN |

FOREIGN PATENT DOCUMENTS

| | | | |
|---|---|---|---|
| 465133 | 8/1951 | Italy | 301/9 G |
| 470655 | 8/1937 | United Kingdom | 301/9 CN |

Primary Examiner—David A. Scherbel
Attorney, Agent, or Firm—Body, Vickers & Daniels

[57] ABSTRACT

A central nut wheel mounting for securing a motor vehicle wheel with a central nut to an axle supported adapter includes a spring biased slidable pawl carried interior of the central nut that is normally locked between circumferential ratchet teeth on the adapter by a locking bolt which is actuated exterior of the nut to unlock the pawl and permit rotation of the central nut for mounting and removal of the wheel, preferably by a wrench which is adapted to torque the nut while concurrently releasing the locking bolt. The wheel is directly drivingly connected to the axle by the drive lug nuts which clamp the adapter to the axle.

21 Claims, 16 Drawing Figures

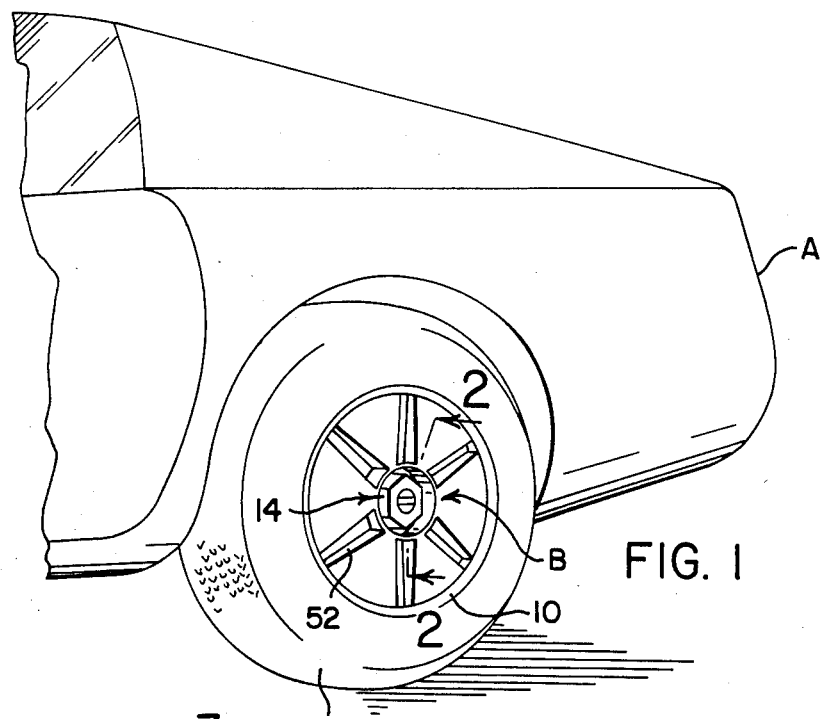
FIG. 1
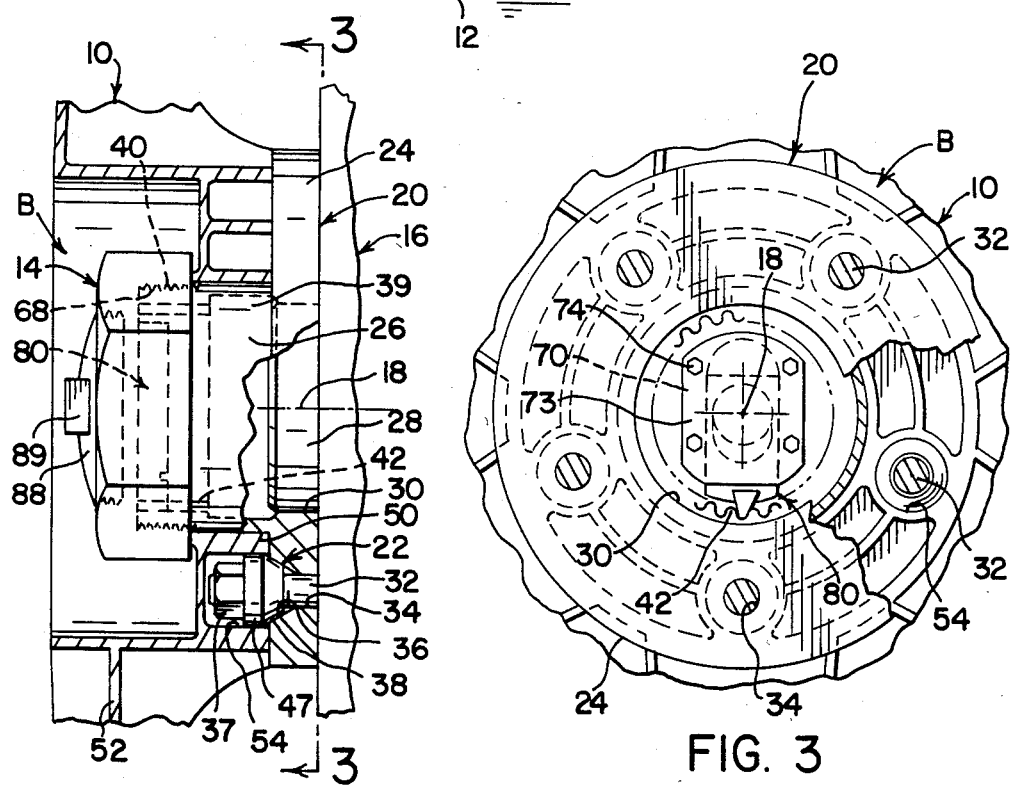
FIG. 2
FIG. 3

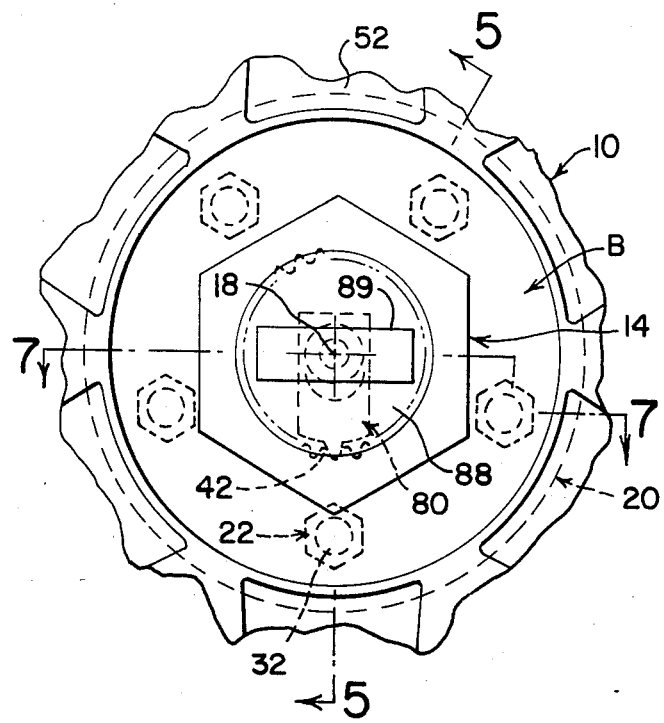
FIG. 4
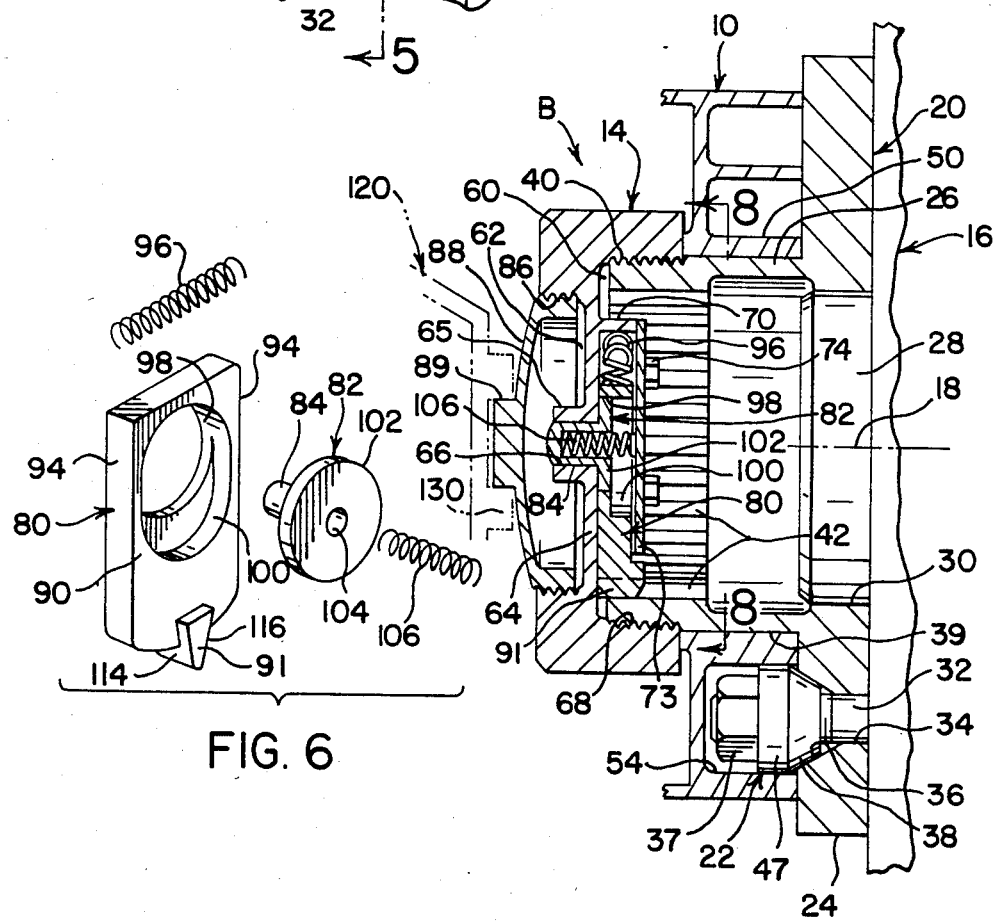
FIG. 6
FIG. 5

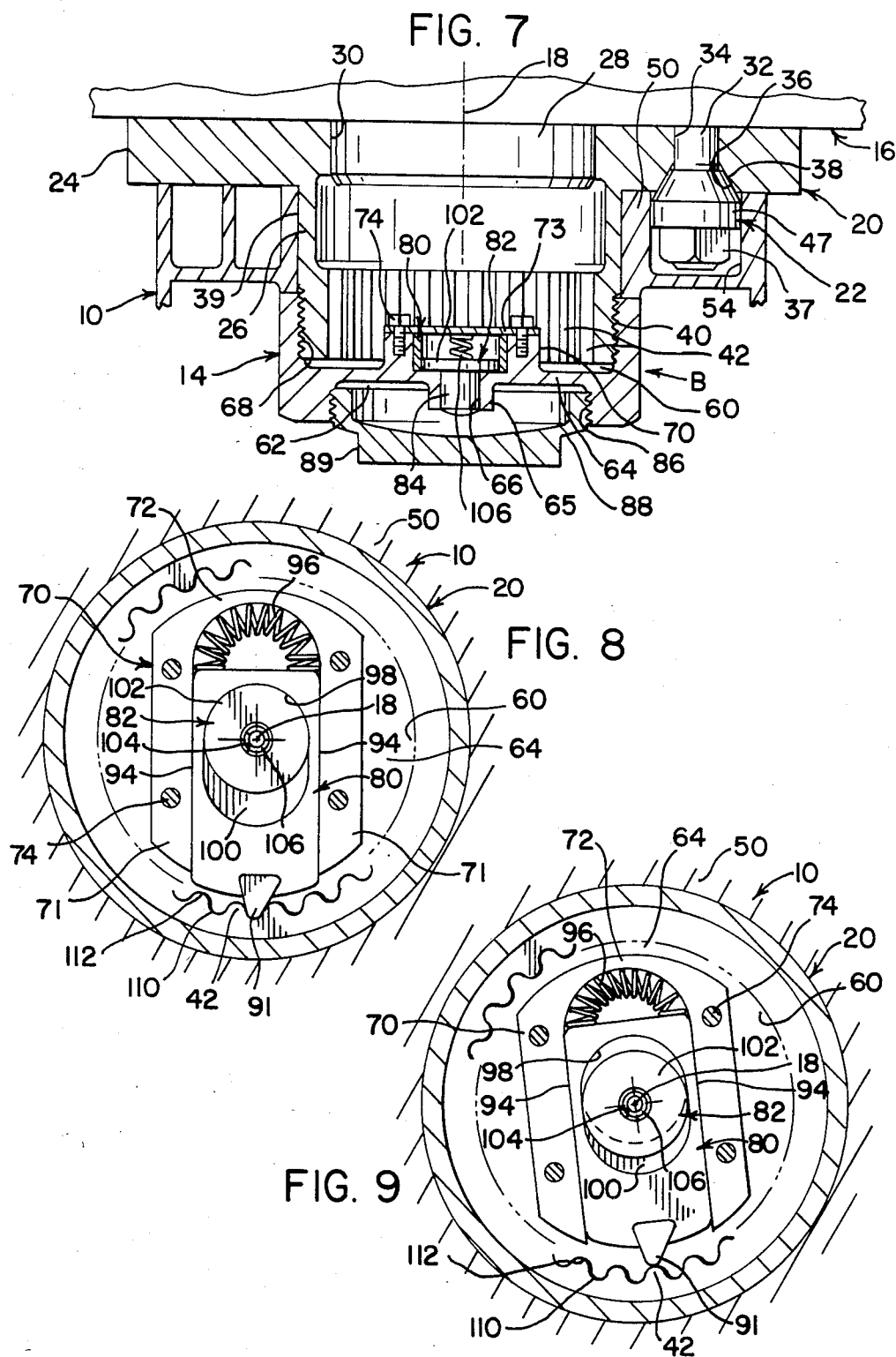

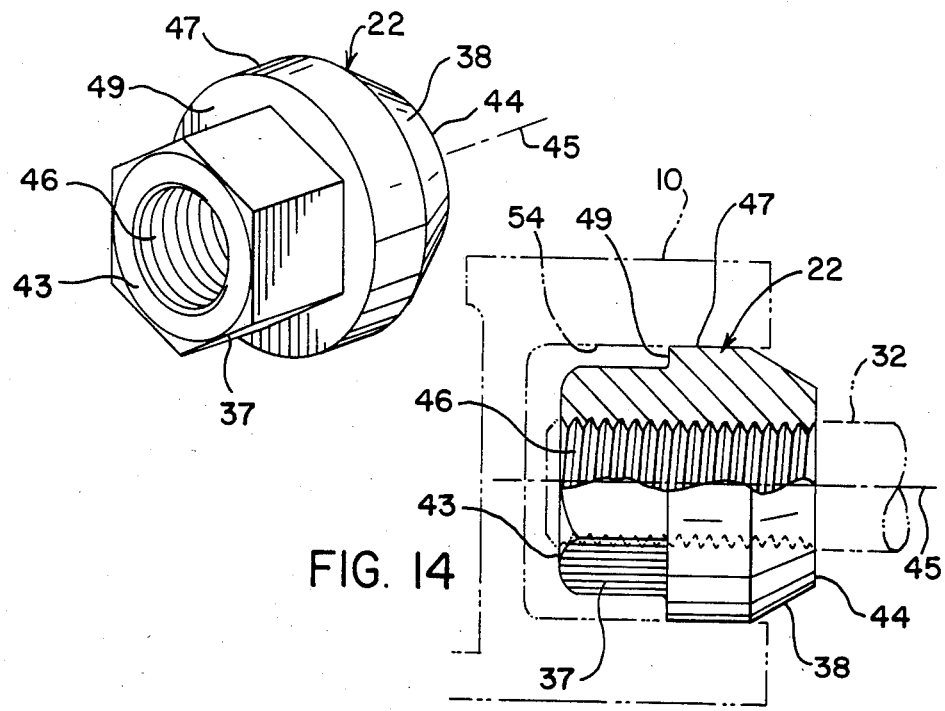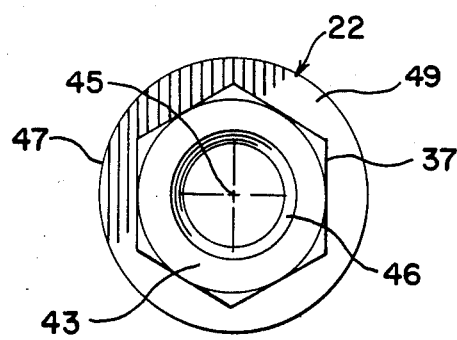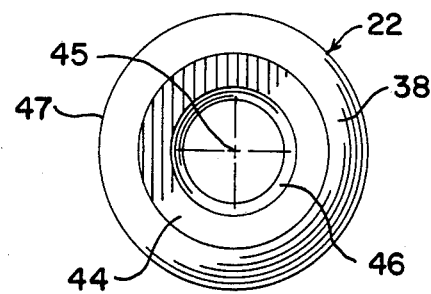

LOCKABLE CENTRAL NUT FOR VEHICLE WHEEL MOUNTING

BACKGROUND

The present invention relates to the mounting of motor vehicle wheels, and in particular, to a motor vehicle wheel which is mounted on an axle hub and retained by a single self-locking central nut.

The present invention is particularly adapted to a passenger vehicle and will be described with specific reference thereto; however, it will be apparent that the invention has broader applications and may be employed for mounting the wheels of other types of vehicles wherein quick and simplified mounting and secure retention of the wheel is desired.

Typically, the wheel of passenger vehicles are attached to the axle by means of a plurality of mounting studs and lug nuts. The axle includes an outwardly projecting annular hub which is telescoped through a central opening in the wheel and serves to concentrically locate the wheel with the axis of axle rotation. The studs are attached to an axle flange in a circumferentially spaced pattern and project through a corresponding socketed hole pattern in the wheel. In assembly, the lug nuts are tightened by a conventional wrench to clamp the wheel between the lug nuts and the axle flange, thereby axially retaining and providing torque transmission to the wheel. For mounting and removal of the wheel for repair or replacement, each of the lug nuts must be removed.

Where speed of wheel change is important, such as race cars and the like, central nut wheel mountings are commonly used. In these constructions, the wheel hub includes an exterior thread which projects outwardly beyond the wheel hub. A central nut having an interior thread is threaded over the hub and provides the sole clamping force for retaining the wheel on the hub. The torque transmission is provided by axially projecting drive pins received within aligned holes in the wheel. Such central nuts may be provided with a hexagonal shape for tightening with a conventional socket wrench or may be provided with a plurality of radially projecting arms which are impacted by a mallet or like device for tightening or loosening the nut. Such central nuts, unless sufficiently torqued, are prone to loosening under driving conditions leading to a loss of wheel stability and loss of wheel retention under adverse conditions. Central nut wheel mountings are also becoming increasingly popular with automotive enthusiasts. The performance, styling and other benefits of such wheel mountings make the centrally retained wheel an attractive option or modification for passenger vehicles. Therein, an adapter is fixedly mounted on an axle hub using the existing studs and lug nuts. The adapter has an outwardly projecting annular hub for positioning the wheel and an outboard threaded end which receives the central nut. The adapter includes axial drive pins which engage recesses in the wheel to transfer torque to the adapter and through the studs to the axle. Inasmuch as these drive pins are normally located on the same diameter as the lug nuts, there is the possibility that the wheel may be mounted with the lug nuts on the wheel recesses. The heads of the lug nuts are not intended for direct drive transmission and may fail under high loading conditions. Further, because these operators are not as experienced as racing personnel, not as fully aware of the installation requirements or may not have sufficient strength or proper equipment for the installation, the potential for inadequate tightening and consequent loosening of the nut is increased. To guard against the loosening of the nut, numerous approaches have been taken to secure the nut to the adapter. For instance, the nut and the adapter may have alignable holes through which safety pins or safety wires may be attached. With such an arrangement, when the nut is at an acceptable installation torque, it is further rotated until the holes in the nut and the adapter are aligned. However, at these torque levels, it is difficult to align the holes at this single alignment position. Moreover, the additional tightening may increase the force required to remove the nut detracting from the mounting advantages of the system. Further, the difficulty in obtaining alignment may cause the operator to forego the locking device when alignment problems are encountered. While additional holes may be provided to provide for finer adjustment, this increases the cost of the assembly while not significantly reducing the installation and removal time and its complexity. Thus, the need exists for a simplified central nut wheel mounting for passenger vehicles which is readily installed and wherein the central nut is securely locked to the adapter hub and which remains so locked until removal is desired.

BRIEF SUMMARY OF THE INVENTION

The present invention overcomes the above mentioned problems and provides the needed benefits by providing a central nut wheel mounting which is readily assembled to the vehicle and can be tightened to the desired torque and which is thereafter automatically locked to the hub regardless of nut clamping pressure, thus eliminating loosening and loss of wheel retention. This is accomplished by providing an adapter which is attached to the axle hub by drive lug nuts which additionally constitute the direct drive linkage to the axle hub. Such drive lug nuts eliminate the need for the supplemental drive pins and remove the drive pins and the adapter from the wheel to axle drive linkage. The central nut is fastened to the adapter hub with a self-locking connection. More particularly, a pawl is slidably carried in a rearward interior cavity of the nut and is spring biased toward a circumferential series of ratchet teeth formed on an inner cylindrical surface of the hub. The pawl is automatically locked in the extended locking position by a lock bolt which is biased into engagement with a locking hole in the pawl. The engagement between the pawl and the ratchet teeth prevents relative rotation between the nut and the hub regardless of the nut clamping force. The lock bolt projects centrally through the nut and is accessible exteriorly thereof. When the lock bolt is depressed, it disengages the pawl blocking hole and permits radial shifting of the pawl, such that the pawl tip can ride over the ratchet teeth for rotation of the nut in either direction. This movement causes an audible clicking sound which enables the operator to sense the progress of the nut tightening and to determine when the pawl is nested between the ratchet teeth. Preferably, the torquing and unlocking are provided by a wrench having a socket engagable with the torque transmitting faces of the nut. A projecting pin in the wrench socket depresses the lock bolt in the operative position to unlock the pawl. Alternatively, these features can be accomplished by manual depression of the button and simultaneous torquing of the nut. After removal of the wrench, the pawl is automatically locked as the pawl tip enters the space between the ratchet teeth. As previously mentioned, the clicking sound enables the operator to sense that the locked condition has been achieved. Thus, after removal of the wrench, the pawl will automatically lock by the spring biased lock bolt shifting to the normally locked condition. In the event rotation stops when the pawl tip is riding over a ratchet tooth, the pawl will assume the automatic locked position upon any subsequent dynamic loosening of the nut, as soon as the pawl can enter the next nested position. This ensures that only minimal loosening of the nut can take place under dynamic conditions and that retention of the nut on the adapter is insured regardless of initial clamping force or driving conditions.

Accordingly, it is an object of the present invention to provide a central nut wheel mounting for motor vehicle wheels which is easily installed and resists loosening.

Another object of the present invention is to provide a central nut for mounting a vehicle wheel to a hub which is automatically locked thereon against loosening.

Another object of the present invention is to provide a centrally mounted wheel carried by an adapter which is drivingly connected to a vehicle axle by the adapter lug nuts.

Yet another object of the present invention is to provide a lug nut for attaching an adapter hub to the axle which additionally serves as the drive connection with the vehicle wheel.

A further object of the present invention is to provide a centrally mounted wheel assembly wherein the wheel is mounted at the wheel hub by a central nut having a locking pawl which engages a ratchet surface on the hub and is locked in position after mounting to prevent dynamic loosening of the nut in service.

Still another object of the invention is to provide a wheel assembly wherein the wheel is retained on the wheel hub by a central nut having a slidable internal pawl which is normally biased against a ratcheted inner surface on the hub and is automatically locked thereat by a cooperating locking member.

A still further object of the invention is the provision of a normally locked mounting nut for a motor vehicle wheel which is unlocked by a nut torquing tool.

Still another object of the present invention is the provision of a wrench for installing and removing a lockable central nut wherein the wrench includes a socket portion for engaging the torque transmitting surfaces of the nut and an unlocking member carried within the socket which unlocks the nut whenever the wrench in the torque applying position.

DESCRIPTION OF THE DRAWINGS

The above and other objects of the present invention will become apparent to those skilled in the art upon reading the following detailed description taken in conjunction with the following drawings in which:

FIG. 1 is a partial side sectional view of a passenger vehicle incorporating a vehicle wheel mounting in accordance with the present invention;

FIG. 2 is an enlarged cross-sectional view taken along line 2—of FIG. 1;

FIG. 3 is a view taken along line 3—3 of FIG. 2;

FIG. 4 is an enlarged front elevational view of the wheel mounting shown in FIG. 1;

FIG. 5 is an enlarged cross-sectional view taken along line 5—5 in FIG. 4 showing the wrench in operative position for removing the cover disk;

FIG. 6 is an enlarged pictorial view of the locking pawl assembly for the lockable central nut;

FIG. 7 is an enlarged cross-sectional view taken along line 7—7 in FIG. 5;

FIG. 8 is a view taken along line 8—8 in FIG. 5 showing the pawl in the locked position;

FIG. 9 is a view similar to FIG. 8 showing the pawl in the unlocked position:

FIG. 13 is a pictorial view of the drive lug nut;

FIG. 14 is a partially sectioned side elevational view of the drive lug nut shown in FIG. 13;

FIG. 15 is a view taken along line 15—15 in FIG. 14; and,

FIG. 16 is a view taken along line 16—16 in FIG. 14.

DETAILED DESCRIPTION OF THE PREFERRED EMBODIMENT

Figure 10:
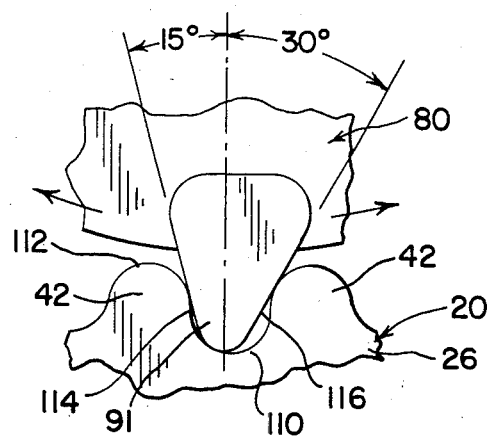
FIG. 10 is an enlarged view showing engagement of the pawl tip between the ratchet teeth.

Referring now to the drawings wherein the showings are for the purposes of illustrating the preferred embodiment of the invention only and not for purposes of limiting same, FIG. 1 shows a passenger vehicle A having a lockable central nut wheel mounting B made in accordance with the present invention. The wheel mounting B is shown on the rear wheel of the vehicle A, but it will be apparent that like constructions are used for all the vehicle wheels. More particularly, the lockable central nut wheel mounting B fastens a vehicle wheel 10 including a tire 12 to the vehicle axle, not shown, by means of a lockable central nut 14. As hereinafter used, the term central nut denotes that a single fastener is being used to axially retain the wheel in fixed relationship with the vehicle axle. The configuration of the central nut 14 may take various forms, and the installation and removal thereof as well as the tools associated therewith will be dictated by design, styling and other considerations without detracting from the features and advantages of the invention as hereinafter set forth.

Referring now to FIG. 2, the wheel 10 is retained on a conventional annular axle hub 16 attached to the outboard end of an axle, not shown. The hub 16 rotates about a transverse horizontal axis 18. While the construction will vary from vehicle to vehicle, the axle hub 16 constitutes the rotatable surface to which the wheel 10 is coaxially attached. The wheel mounting B generally comprises an adapter 20 fastened to the hub 18 by drive lug nuts 22 and the lockable central nut 14 which fastens the wheel 10 to the adapter 20 as driven by the drive lug nuts 22.

The adapter 20 comprises an annular flange 24 having an outwardly projecting cylindrical hub 26. The flange 24 is clamped against the outer annular surface of the hub 20 by the drive lug nuts 22. The hub 20 has a forwardly projecting annular locating rim 28 which is telescopically received in a cylindrical end bore 30 of the adapter 20 for coaxially locating the adapter 20 with the axis 18. The hub 16, in a conventional manner, has a plurality of threaded studs 32 attached thereto which project axially outwardly from the outer surface thereof. The studs 32 are arrayed in a constant diameter, equally circumferentially spaced pattern. The ends of the studs 32 project through correspondingly oriented holes 34 in the adapter 20. Each hole 34 is provided with a frusto-conical socket 36 is the outer face thereof. The drive lug nuts 22 are threaded over the ends of each stud 32 and have a hexagonal head 37 which is tightened by a conventional wrench to seat a frusto-conical base 38 against the socket 36 and fixedly clamp the adapter flange 24 against the outer surface of the hub 16. In addition to providing the axial clamping force, the studs 32 also function as the torque transmitting linkage between the adapter 20 and the hub 16 and between the wheel 10 and hub 16, as hereinafter described.

As shown in FIGS. 13 through 16, the drive lug nut 22 is a unitary body having annular end faces 43 and 44 axially spaced with respect to a central axis 45. A helically threaded hole 46 extends longitudinally through the nut body coaxially with the axis 45. The frustoconical base 38 is formed at one end of the nut body coaxially with said axis and has a conical angle of about 30° with a minor diameter contiguous with the end face 44 and a major diameter contiguous with an enlarged circular drive shoulder 47. The shoulder 47 has a cylindrical surface of circular cross-section coaxial with said axis 45 and has a close sliding fit with recesses in the wheel as hereinafter described. The shoulder 47 has substantially the same diameter and is contiguous with the major diameter of the frustoconical base 38. The hexagonal head 37 is defined by a cylindrical surface of hexagonal cross-section on the nut body which is coaxial with the axis 45. The head 37 has one end contiguous with the end face 43 and another end adjacent the shoulder 47. The peripheral surface of the head 37 is circumscribed by a circle of substantially smaller diameter than the shoulder and inscribed by a circle of greater diameter than the threaded hole 46. A radial annular face 49 interconnects the head 37 with the shoulder 47.

The shoulder 47 has substantial axial length, generally 20 to 50 percent of the nut length and preferably around 30 percent thereof. The length of the shoulder 47 and the base 35 are substantially equal with the head length about 50 percent longer than the shoulder 47. A substantial shoulder and base length are necessary for proper locating and load bearing between the wheel 10, the adapter 20 and the axle hub 16.

An outer cylindrical locating surface 39 on the adapter 20 adjacent the flange 10 locates the wheel 10 as hereinafter described. An external screw thread 40 is formed at the outer end of the adapter hub 26. A circumferential series of inwardly projecting ratchet teeth 42 are formed about the inner cylindrical surface of the adapter hub 26 adjacent the outer end thereof. The wheel 10 includes a central wheel hub 50 having a central coaxial bore, the inner cylindrical surface of which is telescopically received over the locating surface 38 of the adapter hub 26 to establish coaxial location with reference to the axis 20. The wheel 10 may take many conventional forms. As illustrated, it comprises the wheel hub 50 and an outer rim which are interconnected by a plurality of radially directed arms 52. However, the support section may also constitute radially disposed wire spokes or may be a disc-like stamped or cast construction. The rear face of the wheel hub 50 includes plurality of circumferentially spaced recesses 54 in the same hole patterns of the studs 32. The enlarged circular shoulders 47 on the drive lug nuts 22 are slidably received in the recess and circumferentially orient the wheel 10 with the axle hub 16 and function as the torque transmitting linkage between the wheel 10 and the axle hub 16. This drive connection isolates the adapter 20 as a drive component between the wheel and the axle. The wheel hub 50 projects outwardly and has an outer annular end face which terminates adjacent the inner end of the screw thread 40.

Referring to FIGS. 2 through 5, the central nut 14 comprises a cylindrical body of rectangular geometrical cross-section, illustrated as hexagonal, the peripheral sides of which function as six torque transmitting faces in a well known manner. The central nut 14 includes a rearwardly opening cylindrical cavity 60 and a forwardly opening cylindrical cavity 62. The cavities 60 and 62 are separated by a circular web 64 having a circular boss 65 formed centrally on the outer face thereof. An axial hole 66 is formed centrally through the web and the boss 65. The inner cylindrical surface of the cavity 60 is provided with internal helical thread 68 which mates with the external thread 40 on the adapter hub 50. A generally U-shaped rearwardly projecting wall 70 is formed on the rear face of the web 64. The wall includes parallel legs 71 which are symmetrically disposed with respect to the nut axis. The legs 71 are interconnected by a semi-circular base 72. A cover plate 73 overlies the legs 71 and the base 72 and is connected thereto by fasteners 74. The cover plate 73 and the wall 70 define a radially outwardly opening cavity.

A pawl 80 and a lock bolt 82 are carried by the nut 14 and the pawl is slidably disposed for radial movement in the walled cavity on the web 64. Rectilinear movement of the pawl is guided by inwardly facing surfaces of the wall legs 71. The lock bolt 82 has a stem 84 slidably disposed in the hole 66 in the web 64 and the boss 65. The outwardly opening cavity 62 includes an internal screw thread 86 which receives a correspondingly threaded circular cover disk 88. The cover disk 88 includes a transverse outwardly projecting raised emblem 89. As hereinafter described, the cover disk 88 may be removed from the central nut 14 to permit access to and release of the nut locking assembly.

Referring to FIG. 6, the pawl 80 comprises a generally rectangular body 90 radially outwardly terminating with a generally U-shaped pawl tip 91. The pawl 80 includes parallel side walls 94 which are slidably engaged by the side surfaces of the wall legs 71. Accordingly, the pawl 80 is guided for radially inward and radially outward movement in the walled cavity with respect to the nut body. The pawl 80 is biased by a helixally coiled spring 96. The spring 96 is, as shown in FIGS. 8 and 9, carried in assembly along the base wall 72 and has both ends thereof engaging the rear face of the pawl 80. The spring 96 outwardly biases the pawl 80 toward the ratcheted surface. The pawl 80 is provided with a central circular transverse hole 98. The face of the pawl 80 adjacent the cover plate 73 includes an elongated, longitudinally extending slot 100, the rear portion of which is extensive with the hole 98. The lock bolt 82 includes the cylindrical stem 84 which projects outwardly through the hole 66 in the web 64 and an enlarged circular stop collar 102. The lock bolt 82 has a rearwardly opening passage 104 which retains a helically coiled compression spring 106.

Figure 11:
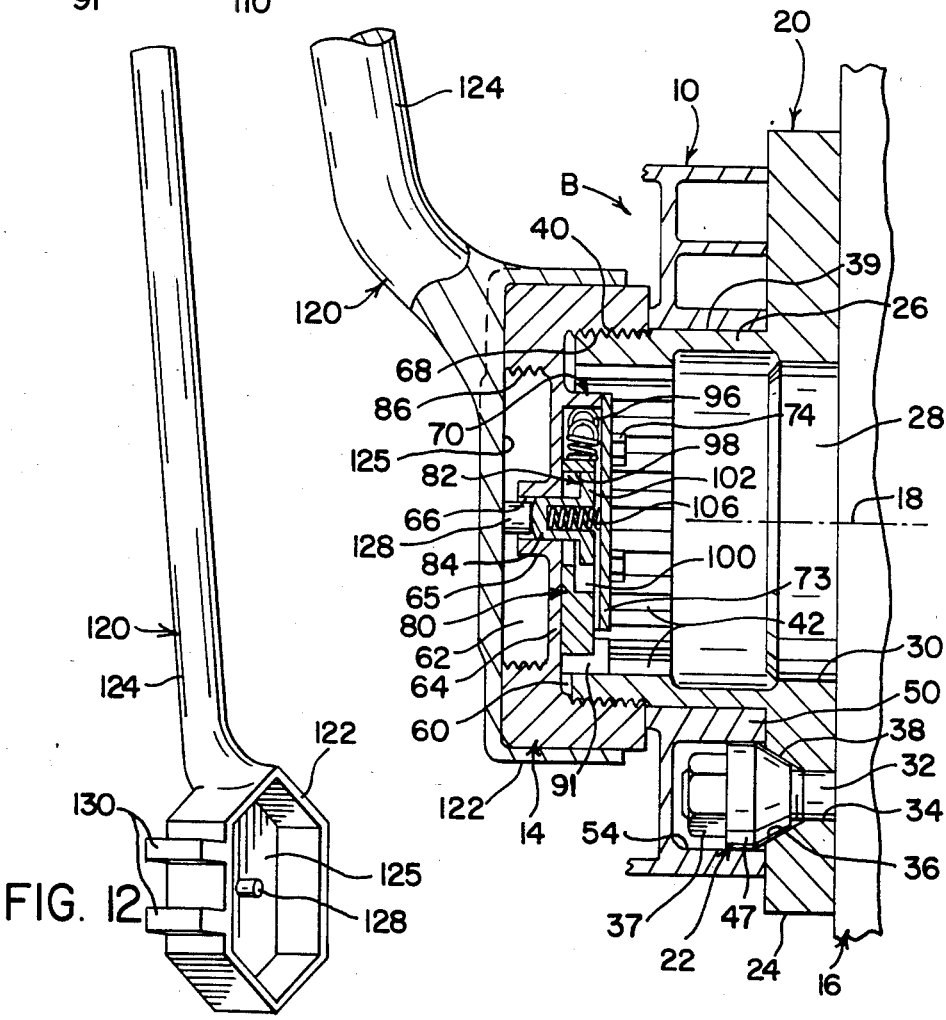
FIG. 11 is a view similar to FIG. 5 showing the wrench in operative position for rotating the lockable central nut.

As shown in FIG. 5, the spring 106 outwardly biases the lock bolt toward the web 64 with the collar 102 seated within the hole 98. This locked position of the pawl 80 is attainable when the pawl 80 is in the radially extended position and as accommodated in assembly, when the pawl tip 92 seats between adjacent ratchet teeth. When the lock bolt 92 is axially inwardly depressed, the collar 102 registers with the slot 100 and the pawl 80 may shift radially within the confines of the slot 100 against the biasing of the spring 96 and as limited by wall base 71 or the stem 84 engaging the side of the hole 98. The amount of radial travel allows the tip 91 of the pawl 80 to pass over the ratchet teeth as the central nut 14 is rotated with respect to the adapter 20. This condition persists as long as the bolt 82 is depressed and continues thereafter until the tip 91 registers between the next adjacent teeth at which time the spring 106 axially shifts the collar 102 into the circular hole 98 to prevent any further radial movement of the pawl 80. Thus, as illustrated in FIGS. 5, 7 and 8, the pawl 80 and the lock bolt 82 are in the locked condition. In FIGS. 9 and 11, the pawl 80 and the lock bolt 82 are in the unlocked condition.

As shown in FIGS. 8 through 10, the ratchet teeth 42 are defined by a circumferential series of interconnected semi-circular sections. In other words, the base 110 is formed by a concave semi-circular axial wall which is contiguous at tip 112 formed by an oppositely facing convex semi-circular axial wall 112. The tips and bases define a circumferential series of generally U-shaped recesses. The teeth may be either milled or broached. The detent function provided thereby may take other cross-sectional profiles as well, such as straight side walls of common inclination or varying inclination. They may also be regularly or intermittently formed about the inner periphery depending on the number of locked conditions desired for each revolution of the nut.

The tip 91 of the pawl 80 is free to enter the recess between the teeth 42 until the apex of the tip 91 seats against the base 110 as shown in FIG. 10. The side walls 114 and 116 of the tip 91 are formed with differing inclinations with respect to the radial direction of pawl movement. Thus, the wall 114 has an angle of 15° and engages the side wall of the ratchet tooth when the nut 16 is rotated in a direction corresponding to loosening movement of the nut 14. The wall 116 which engages the side walls of the teeth upon the tightening movement has a steeper inclination of 30°. This provides for a greater resistance to unloosening when the pawl 80 is in the locked condition while accommodating the rise and fall of the pawl 80 in the unlocked condition for both loosening and tightening movement.

Figure 12:
FIG. 12 is a pictorial view of the wrench shown in FIG. 11.

As shown in FIGS. 5, 11 and 12, a mounting wrench 120 may be used to facilitate installation and removal of the central nut 14. The wrench 120 comprises a hexagonal socket 122 and a handle 124. The socket 122 has an inner cylindrical surface of hexagonal cross section having a sliding fit with respect to the outer hexagonal surface of the nut 14. The base 125 of the socket 122 has a centrally projecting pin 128. The pin 128 depresses the lock bolt 82 when the socket 122 is fully received over the nut 20 as shown in FIG. 11. A side face of the socket 122 includes a pair of spaced lugs 130 which are engagable with the side walls of the projecting emblem 86. The contour and orientation of the side walls will vary in accordance with a change in shape of the emblem.

To remove the wheel 10, as shown in FIG. 5, the cover disk 88 is unscrewed from the central nut 16 to expose the lock bolt 82. This may be done manually or preferably by means of the wrench 120 which positioned with the lugs 130 engaging the side walls of the emblem 89 whereby rotation of the handle 124 will unscrew the cover disk 88 from its mounting. After removal of the cover disk, the socket 122 of the wrench 120 is telescoped over the central nut 14 as shown in FIG. 11. The pin 128 depresses the stem 84 of the bolt 82 against the biasing of spring 106 to the unlocked condition wherein the collar 102 enters the elongated slot 100. This will unlock the pawl 80 from the lock bolt thereby permitting radial movement of the pawl 80 and allowing the pawl tip 91 to rise and fall freely with respect to the ratchet teeth 42, as yielding biased thereagainst by the spring 96. The wrench 120 is then appropriately rotated to unscrew the nut 14 from the adapter threads. During rotation of the nut 14, the pawl tip 91 will rise and fall over the crest of the ratchet teeth 42 providing an audible indication of the loosening or tightening. The nut 14 may be fully removed by the wrench 120. Alternatively, the nut may be partially loosened, the wrench removed and with the stem 84 manually depressed, the nut 14 may be manually rotated from engagement with the adapter threads. Thereafter, the wheel 10 may be removed from the adapter in a conventional manner.

For mounting, the above sequence is reversed. With the wheel 10 mounted in roughly aligned location on the adapter 20 and circumferentially oriented thereon by the drive lug nuts 22, the central nut 14 is manually threaded onto the threaded surface of the adapter 20 until the pawl tip 91 is adjacent the teeth 42. After preliminary tightening, the wrench 120 is inserted over the nut 14 to the operative position thereby depressing lock stem 84 and unlocking the pawl 80. The nut 14 is then tightened to the desired torque. Because of the audible nature of the adjustment, the operator will be able to terminate tightening with the pawl tip 91 seated between the teeth, such that removal of the wrench 120 which will allow the lock bolt 82 to assume the locked condition. Thereafter, any tendency for loosening of the nut 14 with respect to the adapter 20 is directly resisted by the locking engagement between the pawl tip 91 and the ratchet teeth 42. In the event tightening is terminated with the pawl tip not in the seated position, removal of the wrench 120 and release of the bolt 82 will not allow movement of the lock bolt 82 to the locked position. However, should any loosening occur, the pawl tip 91 will be biased and assume as rotation permits complete seating of the pawl tip 91 between the teeth 42 and latching of the pawl 80 by the lock bolt 82. After assembly, the cover disk 88 is reassembled in reverse order of disassembly, either manually or with the wrench 120.

As alternatives to manual or socket release of the locking assembly, other means may be provided. For instance, a lever may be provided on the exterior of the nut for shifting the locking means to the unlatched position. Similarly, the cover may incorporate a lock cylinder which is actuated to release the locking arrangement. However, as long as the tightening and loosening of the nut with respect to the adapter can proceed only by maintaining the unlocked condition, the benefits described above may be nonetheless attained. Further, with regard to the sliding, locking arrangement, the same may be provided by pawl and ratchet surfaces of differing orientations and shapes but which will nonetheless be effective to resist rotation of the nut. Still further, it is apparent that the adapter may be eliminated by providing corresponding structure directly on the axle hub.

We claim:

1. A wheel mounting for connecting a wheel having a central opening to a rotatable axle support of a motor vehicle comprising:
   an adapter adapted to be fixedly mounted on the axle support, said adapter having an annular hub having inner and outer cylindrical surfaces, said outer cylindrical surface being slidably received through the central opening in the wheel; a threaded portion on the outer cylindrical surface of said hub adjacent the outer end thereof;
   nut means having an outer peripheral torque transmitting surface and a rearwardly opening cavity defined by a base wall and cylindrical wall; a threaded portion on the cylindrical wall threadably engagable with said threaded portion of said hub of said adapter;
   ratchet means formed on said inner cylindrical surface of said hub adjacent the outer end thereof;
   pawl means slidably supported on said base wall of said nut means for radial movement between a first position in engagement with said ratchet means and a second position out of engagement with said ratchet means;
   locking means operatively associated with said pawl means movable between a locked position in engagement with said pawl means in said first position for locking said pawl means thereat to thereby prevent relative rotation between said nut means and said hub, and, an unlocked position out of engagement with said pawl means; and,
   release means carried by said base wall operatively associated with said locking means and accessible through said base wall from exterior of said nut means for moving said locking means from said locked position to said unlocked position to thereby permit movement of said pawl means to said second position and relative rotation between said nut means and said hub.

2. A wheel mounting as recited in claim 1 wherein said ratchet means comprise a circumferential series of radially inwardly projecting tooth members and said pawl means includes a radially outwardly projecting tip which is radially positioned between adjacent teeth members in said first position whereby said tip engages the ratchet teeth to prevent said relative rotation.

3. The wheel mounting recited in claim 2 wherein said pawl means include laterally spaced sides and said base wall includes rearwardly projecting walls having laterally spaced surfaces slidably engaging said sides of said pawl means for guiding said pawl means during said radial movement between said first position and said second position.

4. The wheel mounting recited in claim 3 wherein a cover plate connected to said wall on said base wall defines a radially outwardly opening cavity in which said pawl means is slidably supported.

5. The wheel mounting recited in claim 4 wherein first spring means retained in said cavity biases said pawl means to said first position.

6. The wheel mounting recited in claim 5 wherein second spring means retained in said cavity biases said locking means to said locked position.

7. The wheel mounting as recited in claim 6 wherein said projecting wall has a semi-circular base and said first spring means is a helically coiled spring engaging said base along the length thereof with both ends engaging the pawl.

8. The wheel mounting recited in claim 6 wherein said pawl means includes an axial aperture and said locking means includes a plug member conforming to and slidably received within said aperture when said locking means are in said locked position to prevent radial movement of said pawl means from said first position.

9. The wheel mounting recited in claim 8 wherein pawl means include an enlarged recess contiguous with said aperture which receives said plug member in said unlocked position to permit movement of said pawl means between said first position and said second position.

10. The wheel mounting as recited in claim 9 wherein said base wall of said nut means includes a central hole in which said release means is slidably supported.

11. The wheel mounting as recited in claim 10 wherein said locking means is ridgedly connected to said release means.

12. The wheel mounting as recited in claim 11 wherein said enlarged recess is formed in the surface of said pawl means adjacent said cover plate and said second spring means is compressively retained between said cover plate and said plug member.

13. The wheel mounting recited in claim 12 wherein said release means and said lock means comprise a circular stem slidably supported in said hole in said base wall and a circular plug coaxial therewith having a diameter substantially greater than said stem.

14. The wheel mounting recited in claim 13 wherein a rearwardly opening recess is formed coaxially in said plug and said stem and said second spring means has one end retained therein and a second end compressively engaging said cover plate.

15. The vehicle wheel recited in claim 14 wherein said tip is generally triangular having radially converging side walls engagable with said ratchet teeth.

16. The vehicle wheel assembly as recited in claim 15 wherein said side walls have differing inclinations with respect to said ratchet teeth.

17. The vehicle wheel assembly as recited in claim 16 wherein the side wall engaging a ratchet tooth for loosening rotation of said nut means has the lesser inclination with respect to said ratchet teeth.

18. The wheel mounting assembly recited in claim 15 wherein said tip maintains yielding sliding engagement with the radially inward portions of the ratchet teeth during relative rotation of said nut means.

19. The wheel mounting recited in claim 1 wherein said teeth members are defined by alternating concave and convex walls.

20. The wheel mounting assembly recited in claim 19 wherein said walls are semi-circular.

21. In a central nut wheel mounting having a wheel clamped to a rotatable axle by a single nut threadably received over an annular hub connected to an axle;
   the improvement comprising:
   ratchet means on an interior surface of the hub;
   pawl means carried interior of the nut and normally biased into detented engagement with said ratchet means; and,
   lock means carried by the nut and normally biased into engagement with said pawl means for locking said pawl means at said detented engagement and being movable through actuation exterior of the nut out of engagement with said pawl means.

* * * * *